(12) United States Patent
Vovesny

(10) Patent No.: US 11,148,624 B2
(45) Date of Patent: Oct. 19, 2021

(54) BUMPER ARRANGEMENT FOR A MOTOR VEHICLE

(71) Applicant: BENTELER AUTOMOBILTECHNIK GMBH, Paderborn (DE)

(72) Inventor: Martin Vovesny, Ceske Budejovice (CZ)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 81 days.

(21) Appl. No.: 16/797,343

(22) Filed: Feb. 21, 2020

(65) Prior Publication Data
US 2020/0269787 A1 Aug. 27, 2020

(30) Foreign Application Priority Data
Feb. 22, 2019 (DE) .......................... 102019104565.7

(51) Int. Cl.
*B60J 9/00* (2006.01)
*B60R 19/18* (2006.01)
*B60R 19/34* (2006.01)

(52) U.S. Cl.
CPC .............. *B60R 19/18* (2013.01); *B60R 19/34* (2013.01)

(58) Field of Classification Search
CPC ....... B60R 19/34; B60R 19/18; B60R 19/483; B60R 2019/247; B60R 2019/182; B60R 2019/262; B62D 21/152
See application file for complete search history.

(56) References Cited

U.S. PATENT DOCUMENTS

| | | | | |
|---|---|---|---|---|
| 7,290,811 B1* | 11/2007 | Arns | .................. | B60R 19/24 293/133 |
| 7,543,866 B2* | 6/2009 | Arns | .................. | B60R 19/24 293/133 |
| 7,810,868 B2* | 10/2010 | Braunbeck | .............. | B60R 19/34 296/187.03 |
| 8,210,601 B2* | 7/2012 | Terada | .................. | B62D 21/152 296/187.09 |
| 8,844,987 B2* | 9/2014 | Kaneko | .................... | B60R 19/34 293/133 |
| 8,985,651 B2* | 3/2015 | Honda | .................... | B60R 19/34 293/120 |
| 9,199,592 B1* | 12/2015 | Nusier | .................... | B60R 19/34 |
| 2001/0013706 A1* | 8/2001 | Artner | .................... | B60R 19/34 293/133 |

(Continued)

FOREIGN PATENT DOCUMENTS

| | | |
|---|---|---|
| DE | 4401865 | 8/1994 |
| DE | 102006013273 | 9/2007 |
| DE | 102016116172 | 3/2018 |

*Primary Examiner* — Kiran B Patel
(74) *Attorney, Agent, or Firm* — Sheridan Ross P.C.

(57) ABSTRACT

The invention relates to a bumper arrangement for a motor vehicle, with a crossmember, a body element, a crash box arranged between crossmember and body element. The invention is distinguished in that
a) a front axis of rotation is formed by a structural element, and a rear axis of rotation by a further structural element in the region of an inner wall of the crash box, and
b) a tension relief element or a tension delay element is arranged in the region of an outer wall of the crash box.

17 Claims, 8 Drawing Sheets

(56) References Cited

U.S. PATENT DOCUMENTS

| | | | | |
|---|---|---|---|---|
| 2002/0113447 | A1* | 8/2002 | Frank | B60R 19/34 293/133 |
| 2000/0125254 | * | 6/2006 | Arns | B60R 19/34 293/155 |
| 2006/0181090 | A1* | 8/2006 | Boivin | B60R 19/18 293/146 |
| 2008/0030031 | A1* | 2/2008 | Nilsson | B60R 19/34 293/133 |
| 2009/0026777 | A1* | 1/2009 | Schmid | B60R 19/34 293/133 |
| 2009/0302624 | A1* | 12/2009 | Zielke | B60R 19/34 293/132 |
| 2010/0194125 | A1* | 8/2010 | Wibbeke | B60R 19/24 293/120 |
| 2011/0291431 | A1* | 12/2011 | Buschsieweke | C22C 38/32 293/133 |
| 2012/0228890 | A1* | 9/2012 | Frank | B60R 19/34 293/155 |
| 2015/0061307 | A1 | 3/2015 | Nakanishi | |
| 2015/0115633 | A1* | 4/2015 | Braunbeck | B60R 19/24 293/132 |
| 2015/0246651 | A1* | 9/2015 | Muraji | B62D 21/152 296/187.1 |
| 2016/0121934 | A1* | 5/2016 | Murayama | B62D 25/082 296/187.09 |
| 2016/0297387 | A1* | 10/2016 | Prasoody | B60R 19/24 |
| 2017/0021868 | A1* | 1/2017 | Watanabe | B62D 21/152 |
| 2017/0113638 | A1* | 4/2017 | Ahuja | B60R 19/34 |
| 2017/0120850 | A1* | 5/2017 | Sugano | B60R 19/34 |
| 2018/0105128 | A1* | 4/2018 | Iizuka | B60R 19/18 |
| 2018/0162452 | A1* | 6/2018 | Hirota | B62D 21/02 |
| 2018/0178845 | A1* | 6/2018 | Hayashi | B62D 25/084 |
| 2019/0168700 | A1* | 6/2019 | Lattorff | B60R 19/04 |
| 2019/0256021 | A1* | 8/2019 | Zierer | B60R 19/34 |

\* cited by examiner

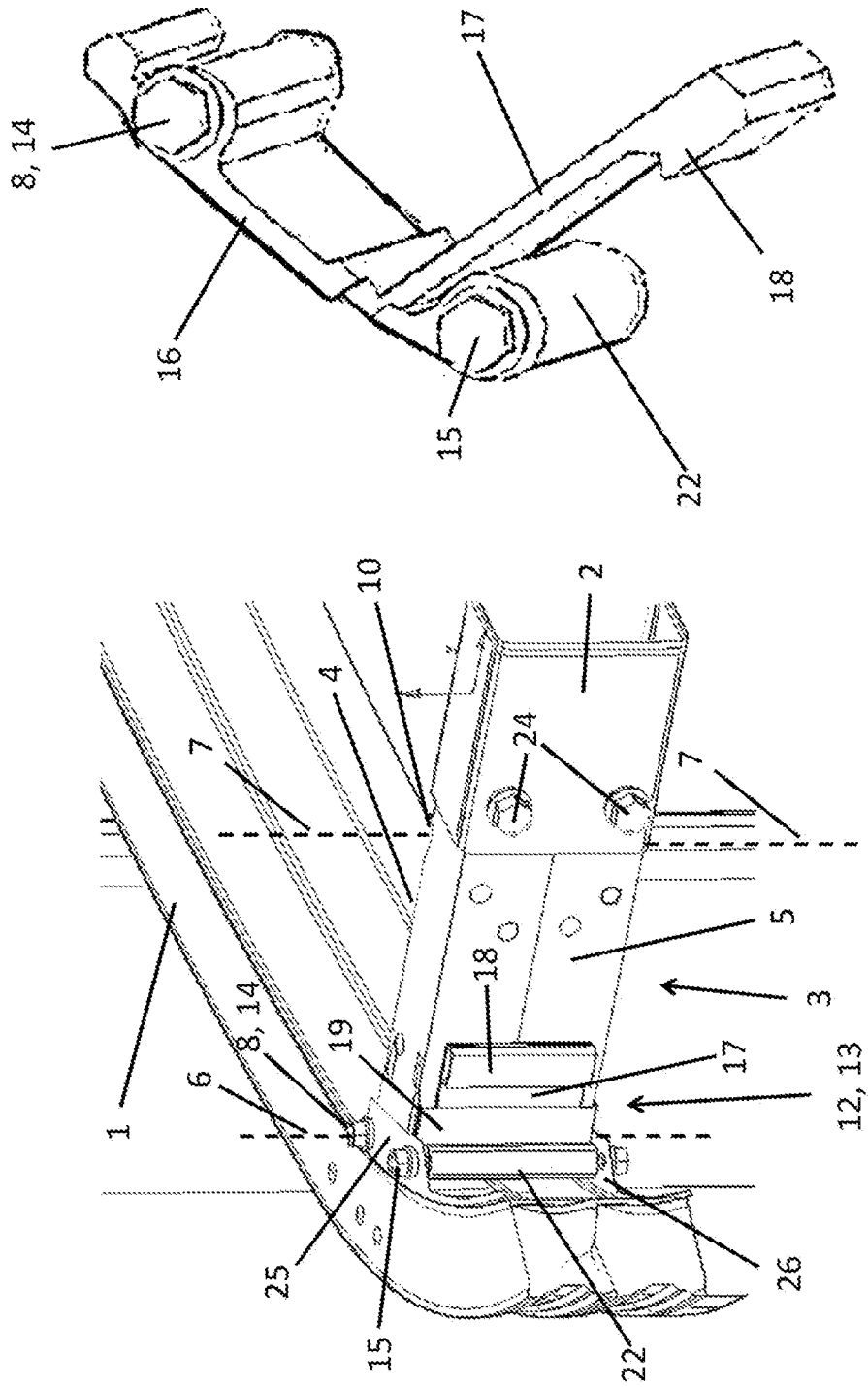

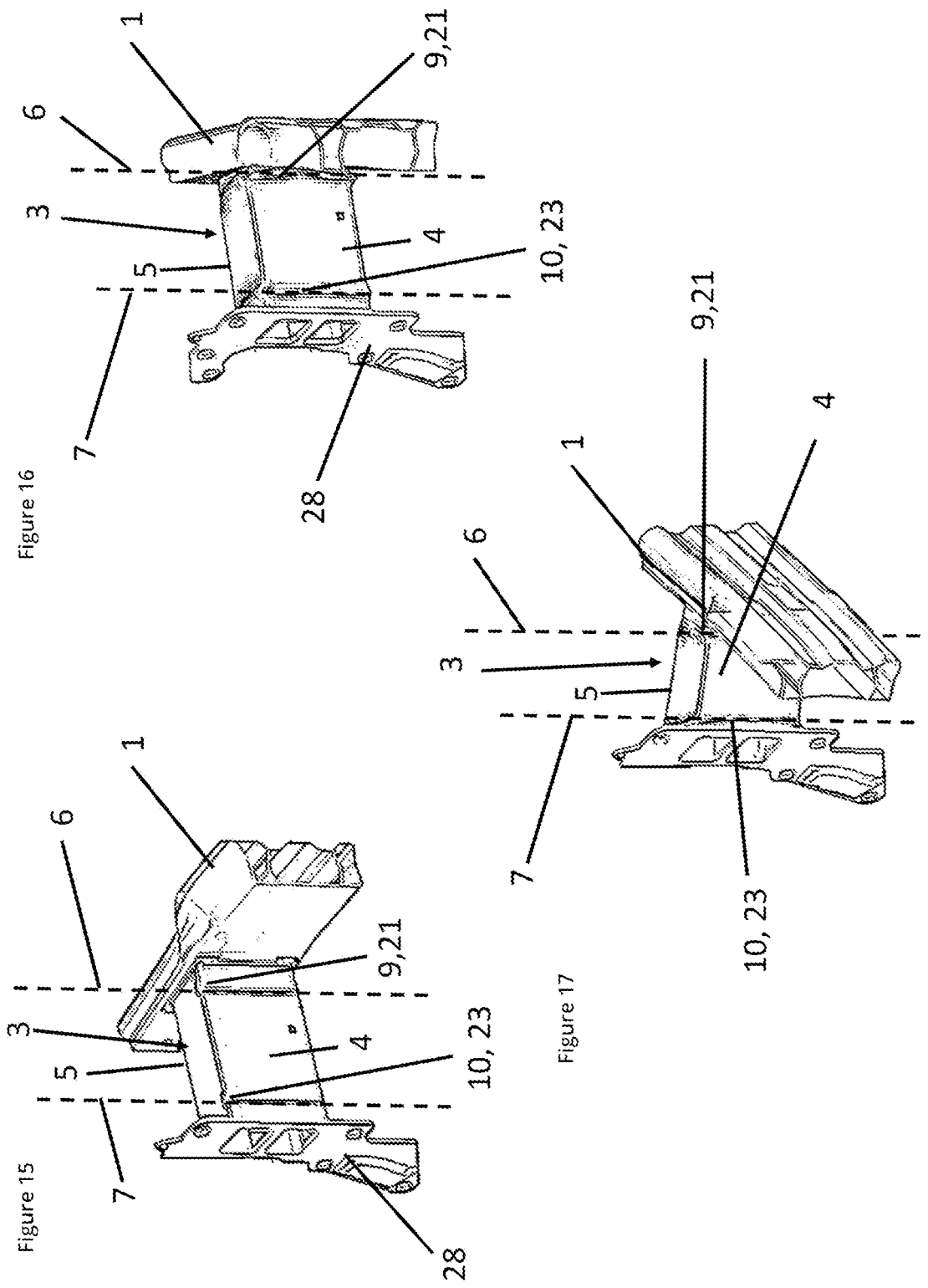

BUMPER ARRANGEMENT FOR A MOTOR VEHICLE

CROSS-REFERENCE TO RELATED APPLICATIONS

This application claims the benefit of German Patent Application No. DE 10 2019 104 565.7 filed Feb. 22, 2019, the entire disclosure of which is incorporated herein by reference in its entirety.

FIELD

The invention relates to a bumper arrangement for a motor vehicle according to the preamble of patent claim 1.

BACKGROUND

Such bumper arrangements for motor vehicles have crash boxes which, firstly, are connected to the crossmember of the bumper arrangement in the end region thereof and, secondly, to body elements, in particular body longitudinal members. The forces occurring during the accident or crash are intended to be converted here by means of the crash boxes into deformation energy and excess energy which is not converted into deformation energy is transmitted past the passenger compartment into the body or body longitudinal members.

However, in the case of conventional bumper arrangements, the crash boxes frequently are not appropriately configured in order in a targeted manner to dissipate the energy or force peaks occurring at the beginning of an accident or crash and to conduct away non-dissipated energy past the passenger cell into the body. On the contrary, in the event of extreme energy and force peaks at the beginning of a crash or accident, the crash boxes or the connection between crash box and crossmember and/or between crash box and body of such bumper arrangements may abruptly begin tearing or collapse, and therefore a controlled dissipation of energy and a controlled transmission of energy are no longer possible and thus the vehicle occupants are exposed to an increased risk.

In order to circumvent this problem, various solution approaches have already been carried out. For example, it has been proposed in DE 10 2016 116 172 A1 to connect the crossmember to the crash boxes in a force-transmitting manner via a respective axis of rotation, wherein said axes of rotation are arranged in the region of the outer walls of the crash boxes. However, a problem in this connection is that, in the event of a crash, high tensile forces can continue to act on the outer walls of the crash boxes, which may lead to an uncontrolled collapsing of the crash boxes or to crossmember, crash box or the connection thereof beginning to tear.

DE 10 2006 013 273 A1 proposes another solution. In this case, the crossmember of the bumper arrangement there is interconnected in the region between the inner walls and outer walls of the crash boxes via two bolt connections. One of the bolt connections here defines a pivot axis, wherein the crossmember is connected so as to be pivotable to a certain extent to the respective crash box by the other bolt connection. However, even with a bumper arrangement of this type, in the event of accidents or in the event of crashes, energy and force peaks may occur, in particular over the further course of the crash, which may result in an uncontrollable collapsing of the respective crash box due to high tensile loadings on the outer walls of the crash boxes, and therefore the safety of the vehicle occupants cannot be guaranteed since the crash energy is not dissipated and conducted away in a controlled manner.

SUMMARY

It is therefore the object of the invention to develop a bumper arrangement for a motor vehicle according to the preamble of patent claim 1 in such a manner that the energy and force peaks occurring both at the beginning of an accident or crash and over the further course do not lead to an uncontrollable collapsing of the crash boxes, but rather the energy of the crash is dissipated and transmitted in a targeted manner. This object is achieved by a bumper arrangement with all of the features of patent claim 1. Advantageous refinements of the invention are found in the dependent claims.

The bumper arrangement according to the invention for a motor vehicle has a crossmember, a body element and a crash box arranged between the crossmember and the body element. The invention is now distinguished in that a front axis of rotation is formed by a structural element, and a rear axis of rotation by a further structural element, in the region of the inner wall of the crash box, and that a tension relief element or a tension delay element is arranged in the region of an outer wall of the crash box.

It is now ensured by means of the invention that the tensile force acting on the outer wall of a crash box during an, in particular central, impact of an obstacle against the crossmember of the bumper arrangement in the event of a crash and which may lead in the prior art to an uncontrollable collapsing of the crash box is introduced into the crash box in a delayed manner by means of the arrangement to the tension delay element, or else the outer wall which is subject to particular loading by the energy and force peaks occurring at the beginning of the crash can be absorbed by the tension relief element at the beginning of the crash. The effect achieved by the measure according to the invention is that the force peaks at the beginning of the crash are absorbed exclusively by deformation of the crossmember and a targeted deformation of the crash boxes takes place only after the force peaks have been dissipated through the crossmember, wherein the remaining crash energy can then be transmitted in a highly targeted manner past the passenger cell into the body element. By means of the configuration according to the invention of the bumper arrangement, the safety of the people in the motor vehicle is therefore significantly increased since force peaks at the beginning of the crash are dissipated solely by the crossmember of the bumper arrangement and are not introduced directly into the crash boxes. By this means, the uncontrollable collapsing of the crash boxes and therefore an unsafe introduction of the excessive crash energy into the motor vehicle are avoided. At the beginning of the crash, the entire crossmember is namely pivoted by the axis of rotation located in the region of the inner wall of the crash box and the crash energy is not introduced directly into the crash boxes. On the contrary, the energy peaks are dissipated by the deformation of the crossmember and the targeted deformation of the crash boxes only takes place subsequently. In particular, the tensile forces occurring on the outer walls of the crash boxes in the event of a central crash are considerably minimized by the invention, and therefore an uncontrollable collapsing of the crash boxes and failure of the crossmember connection and/or body connection are virtually eliminated.

According to a first advantageous refinement of the invention, it is provided here that the tension delay element is connected by means of a screw connection in the region of the inner wall of the crash box both to the crossmember and to the crash box and in the region of the outer wall to the crossmember. The effect achieved in a simple manner by this arrangement is that, in the event of a crash, the crossmember can pivot in relation to the respective crash box about the front axis of rotation, which is on the inner wall, and therefore no tensile loadings act on the outer wall of the crash boxes at the beginning of the crash. By this means, the uncontrollable collapsing of the crash boxes due to high tensile loadings in the region of the outer walls of the crash boxes is avoided.

It has proven advantageous here that the tension delay element is in the form of an angular element having two legs, which is connected by means of a screw connection in the region of the inner wall of the crash box both to the crossmember and to the crash box and in the region of the outer wall to the crossmember. The first leg is arranged substantially at an obtuse angle with respect to the second leg and the second leg is arranged substantially parallel to the longitudinal direction of the motor vehicle. In its end region, the second leg has a hook element which fastens in an end stop to a tab which is arranged on the crash box and through which said hook is guided. The first screw connection in the front region of the inner wall is designed as the structural element forming the front axis of rotation. The effect achieved in a simple manner by this configuration is that, in the event of a crash, the crossmember of the bumper arrangement is pivotable in relation to the respective crossmember about the axis of rotation in the region of the inner wall of the crash box. In the event of a crash, during the pivoting the force and energy peaks are already dissipated through the crossmember or the deformation thereof, and the outer wall of the crash box is subjected to a tensile load and further forces are introduced into the crash box only after the hook element of the angular element reaches its end stop and fastens to the tab. By means of this targeted delay in the tensile loading on the outer wall of the crash box, the latter is prevented from collapsing uncontrollably due to the force and energy peaks at the beginning of the crash. After the force and energy peaks have built up, the tensile loading of the outer wall of the crash box then takes place, said crash box now being able to be deformed in a controlled manner. The excessive energy which is not converted into deformation energy is introduced in a targeted manner into the body, in particular into a body longitudinal member, past the passenger cell.

According to another advantageous refinement of the invention, it is provided that the tension relief element is in the form of a tab which, firstly, is connected to the outer wall of the crash box and, secondly, to the body element, in particular to a longitudinal member of the body. The structural element forming the front axis of rotation and in the form of a predetermined deformation element running vertically or in the vertical direction of the motor vehicle is arranged on the inner wall of the crash box, wherein the predetermined deformation element is in the form of a bead, perforated strip, strength reduction region or the like. By means of this refinement of the invention, in the event of a crash, at the beginning of the crash the outer wall of the crash box is indeed subjected to a tensile stress by the tab arranged there, but said tensile stress is partially absorbed by the tension relief element while a rotation or pivoting of the crossmember in relation to the respective crash box already takes place because of the predetermined deformation element. Also in this refinement of the invention, the force peaks at the beginning of a crash are absorbed by the deformation of the crossmember and, by means of the tension relief element, which is in the form of a tab, on the outer wall of the crash box, are mostly kept away from said outer wall. Only when the force and energy peaks of the crash have been dissipated by the crossmember does a further tensile loading of the outer wall of the crash box now also take place. The effect now achieved by this is that the predetermined deformation element and the tension relief element on the outer wall permit a targeted deformation of the crash box, which avoids an uncontrolled collapsing of the crash box, and therefore the further crash energy can be dissipated in a targeted manner by the deformation of the crash box and can be transmitted into the body or the body element.

According to a further advantageous refinement of the invention, it is provided that the connection of the angular element in the region of the outer wall of the crash box to the crossmember is realized by a screw connection or a welded connection. Screw connections and welded connections of this type have proven advantageous in practice to connect such structural elements, such as crash boxes and crossmembers, to one another. Such a connection of the angular element to the crossmember is therefore also provided in a simple manner by tried and tested connecting techniques. In particular, corresponding tabs can be provided on the crossmember for the connection thereof to the angular element.

If a screw connection has been selected for connecting the angular element to the crossmember, it has proven advantageous for the screw connection in the region of the outer wall of the deformation element to be forcibly guided within an elongated hole or by means of a guide tab. The effect achieved by such a forcible guidance is that even the deformation of the crossmember at the beginning of the crash and therefore the energy dissipation of the energy peaks at the beginning of the crash can be dissipated in a targeted manner, and therefore the subsequent introduction of energy into the crash boxes can take place in an even more targeted way. As a result, the targeted deformation of the crash boxes and the conducting away of the further crash energy by means of the crash boxes are possible in an even more targeted manner. By this means, the safety of the vehicle occupants is increased once again since the crash energy is dissipated in a very targeted way and is transmitted around the passenger cell.

According to another concept of the invention, it is provided that the tab on the outer wall of the crash box is connected to the crash box and/or to the body element for tension relief by means of a screw connection or welded connection. Connections of this type have proven successful for tensile relief and also prevent an uncontrolled collapsing of the crash boxes.

According to a further advantageous refinement of the invention, the rear axis of rotation on the inner wall of the crash box is formed by a structural element which is in the form of a predetermined deformation element, wherein the predetermined deformation element runs vertically or in the vertical direction of the motor vehicle. The design of the rear axis of rotation is released in a simple manner by such an arrangement of a predetermined deformation element. It should be taken into consideration here that, in the event of the design of the front axis of rotation on the inner wall of the crash box in the form of a predetermined deformation element, the front deformation element is weaker than the rear deformation element so that the rotation of the crossmember about the front axis of rotation is ensured at the beginning of the crash in order to dissipate the energy and force peaks.

Furthermore, it has also proven advantageous for the outer wall of the crash box to be provided with at least one reinforcing element at least in sections, in particular opposite the rear axis of rotation of the inner wall. It is thereby ensured that after the rotation has taken place about the front axis of rotation in the event of a crash, rotation about the rear axis of rotation in the region of the inner wall subsequently takes place and deformation on or collapsing of the outer wall of the crash member does not occur. This measure in turn permits the targeted deformation of the crash box and therefore also a targeted conducting away of energy around the occupants of the motor vehicle into the body.

It can be provided here that said at least one reinforcing element is in the form of a sheet metal reinforcement, horizontal bead or the like. Reinforcing elements of this type have already proven successful in diverse ways during the use in the region of such structural elements as crash boxes and crossmembers.

Furthermore, it is provided that both the predetermined deformation element in the front region and also in the rear region of the inner wall of the crash box can be in the form of a bead, perforated strip, strength reduction region or the like. Predetermined deformation elements of this type have already proven successful in diverse ways in the region of structural elements, for example crash boxes and longitudinal or crossmembers, and in the automotive sector for controlling energy flows.

It can furthermore also be provided that at least one predetermined deformation element running horizontally or in the longitudinal direction of the motor vehicle, for example in the form of a bead, perforated strip, strength reduction region or the like, is arranged on the outer wall of the crash box. A deformation element of this type on the outer wall of the crash box can also be used for the targeted deformation of the crash box in the event of a crash, and therefore the excessive energy can be transmitted in a highly targeted and already reduced manner into the body or a body longitudinal member and hence the vehicle occupants remain unscathed in the passenger cell.

Further aims, advantages, features and possible uses of the present invention will emerge from the description below of exemplary embodiments with reference to the drawings. All the features described and/or depicted, in themselves or in any feasible combination, form the subject matter of the present invention, even when considered independently of their combination in the claims or the dependency references thereof.

BRIEF DESCRIPTION OF THE DRAWINGS

In the drawings:

FIG. 1: shows a first exemplary embodiment of a bumper arrangement according to the invention in a perspective view, FIG. 2: shows an angular element of the bumper arrangement according to FIG. 1 in a perspective view, FIGS. 15 to 17: show a chronological illustration of an impact scenario for a bumper arrangement according to FIGS. 9 and 10 in a perspective illustration.

DETAILED DESCRIPTION

Figure 3:
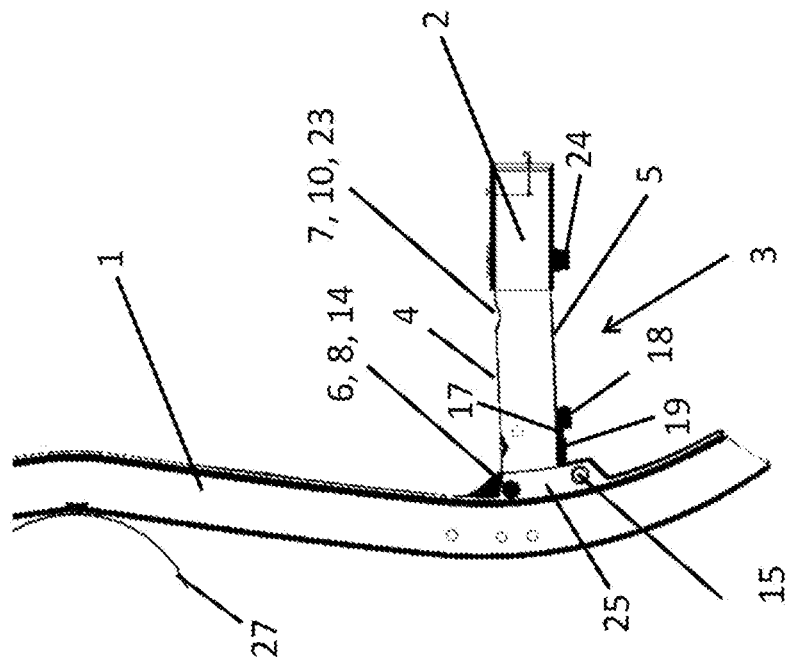
FIGS. 3 to 8: show a chronological scenario of the deformation of a bumper arrangement of FIG. 1 in the event of a crash in a top view from above.
Figure 4:
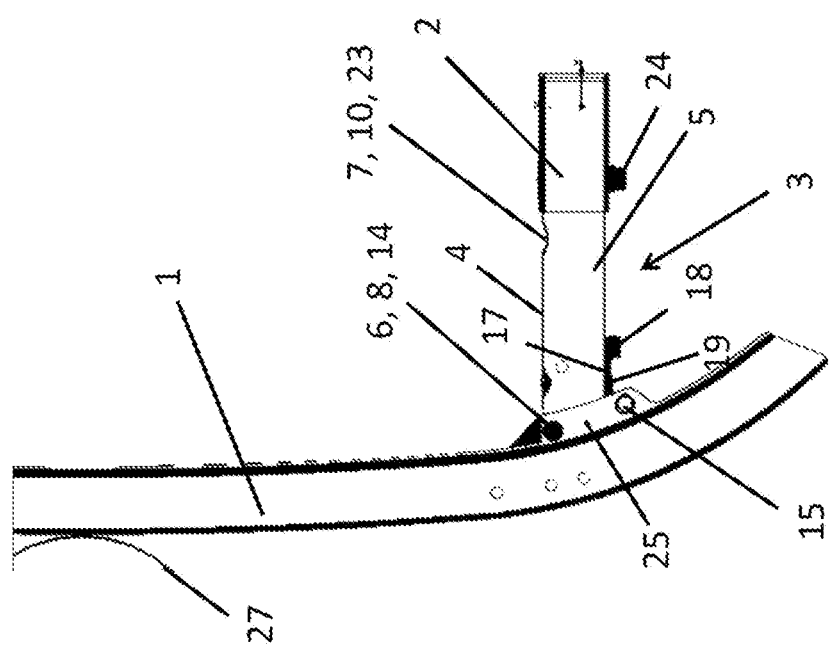

FIG. 1 shows a first exemplary embodiment of a bumper arrangement according to the invention in a perspective illustration. The illustration of FIG. 1 shows the bumper arrangement just for one crash box 3 since the other crash box is formed mirror-symmetrically thereto with respect to the center longitudinal axis of the vehicle.

The bumper arrangement illustrated in FIG. 1 has a crash box 3 which is connected, firstly, to a crossmember 1 and, secondly, to a body element 2 which is in the form of a body longitudinal member. The crash box 3 is connected to the body element 2 predominantly with two screw connections 24. In this exemplary embodiment, the crash box 3 is connected to the crossmember 1 by means of an angular element 13 which is connected, firstly, to the crash box 3 and, secondly, to the crossmember 1. Said angular element 11 is illustrated explicitly in FIG. 2 in a perspective view and consists of two legs 16 and 17. The leg 16 is provided at its open end with a structural element 8 which here is in the form of a screw connection 14. Arranged at the end of the leg 16 opposite the structural element 8 or the screw connection 14 is a further screw connection 15, wherein the screw there is guided through a screw sleeve 22.

The angular element 13 is arranged directly on the crossmember 1 by means of a screw connection or welded connection in FIG. 1. Via the structural element 8, which is in the form of screw connection 14, the angular element 13 is connected in the region of the leg 16 and in the region of an inner wall 4 of the crash box 3 to the latter via the screw connection 14. Corresponding bushings, not shown here, are provided in the crash box 3 so that the screw of the screw connection 14 can be guided through the crash box 3. The angular element 13 is connected to the crossmember 1 via the screw connections 14 and 15, wherein, for this purpose, corresponding tabs 25 and 26 are arranged on the upper side and the lower side of the crossmember 1. The angular element 13 is part of a tension delay element 12, to which a tab 19 which is arranged on the outer wall 5 of the crash box 3 and through which the leg 17 of the angular element 13 is guided is furthermore assigned. Under tensile loading, the angular element 13 now rotates about an axis of rotation 6 which is formed by the structural element 8, which is in the form of screw connection 14, until a hook element 18 which is arranged opposite the leg 16 at the open end of the leg 17 fastens to the tab 19 through which the leg 17 is guided.

Furthermore, a further structural element 10 in the rear region of the inner wall 4 of the crash box 3 can be gathered from FIG. 1. This structural element 10 is in the form here of a bead and forms a rear axis of rotation 7 about which, during the deformation of the crash box, the latter rotates further during or after rotation about the axis of rotation 6.

FIGS. 3 to 8 now show a crash scenario for a bumper arrangement according to the exemplary embodiment of FIG. 1 in a chronological sequence.

FIG. 3 shows the bumper arrangement shortly before a central impact of an obstacle 27 against the crossmember 1. All of the elements of the bumper arrangement that are described in FIG. 1 are still in their original starting position. In particular it can also be seen here that the structural element 10 which is in the form of a bead and forms the rear axis of rotation 7 is provided at the same time as a predetermined deformation element 23 for the crash box 3. As can likewise be clearly seen, in the illustration according to FIG. 3, the tab 19 on the outer wall 5 of the crash box 3 and the hook element 18 of the angular element 13 are still maximally spaced apart from each other prior to the impact.

If the obstacle 27 now strikes centrally against the crossmember 1, the impact energy or crash energy is introduced into the crossmember 1, as a result of which deformation of the crossmember 1 begins. In addition to the deformation of the crossmember 1 in the center thereof, at the same time the crossmember 1 starts pivoting with respect to the crash box 3 about the axis of rotation 6. In the process, the distance of the hook element 18 of the angular element 13 from the tab 19 arranged on the outer wall 5 of the crash box 3 is minimized since the angular element 13 is displaced in the direction of the tab 19 by rotation of the crossmember 1.

Figure 5:
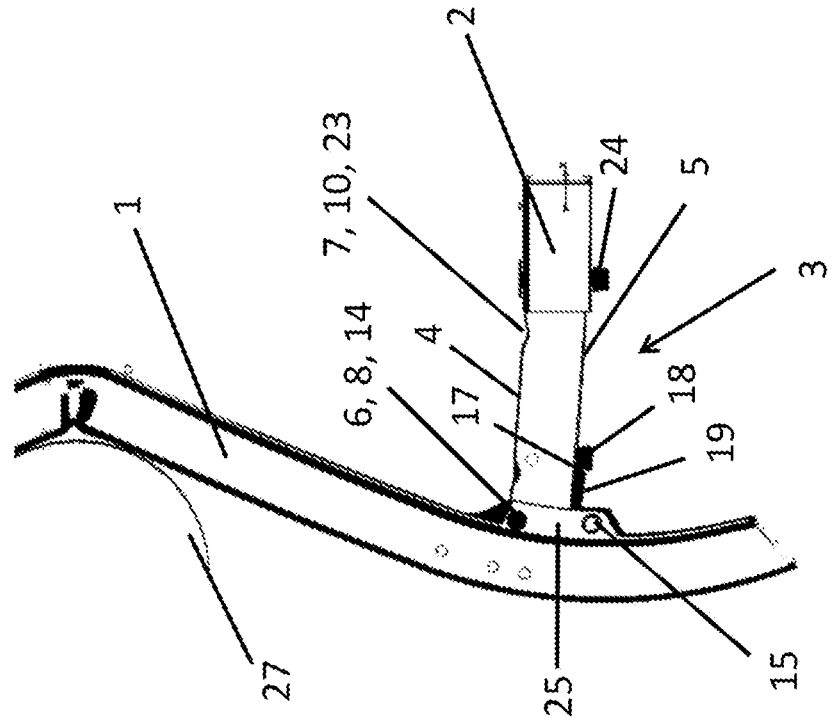
Figure 6:
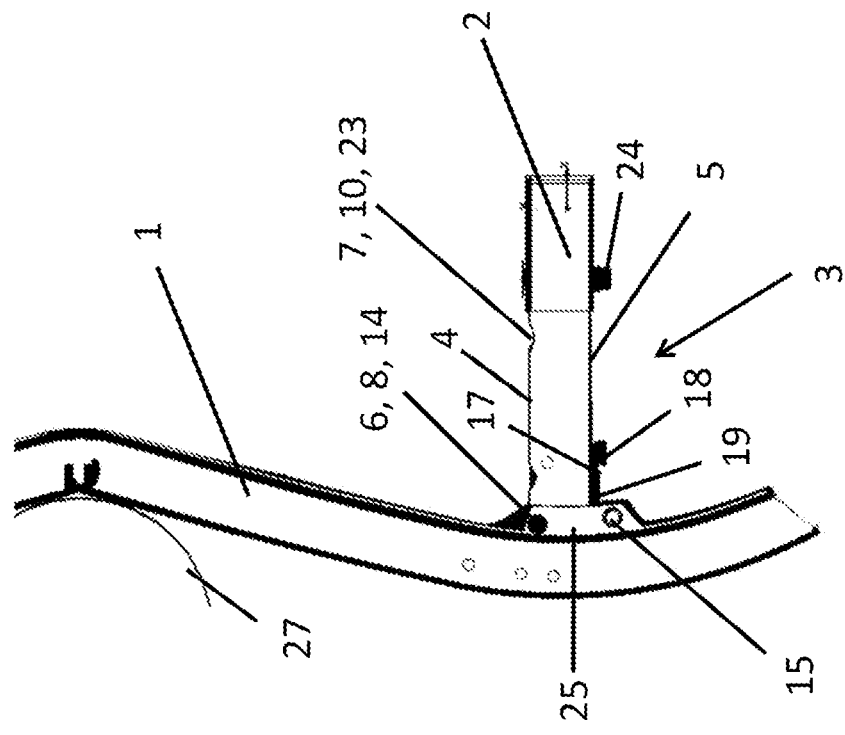

FIGS. 5 and 6 now show further illustrations during the rotation of the crossmember 1 about the axis of rotation 6 before the hook element 18 fastens to the tab 19. It becomes clear here that, at this time, at the beginning of the crash, at which load peaks or energy and force peaks may occur, there is no tensile loading on the outer wall 5 of the crash box 3. The energy introduced by the crash is absorbed up to this point only by the deformation of the crossmember 1. By this means, load peaks at the beginning of the crash are absorbed.

Figure 7:
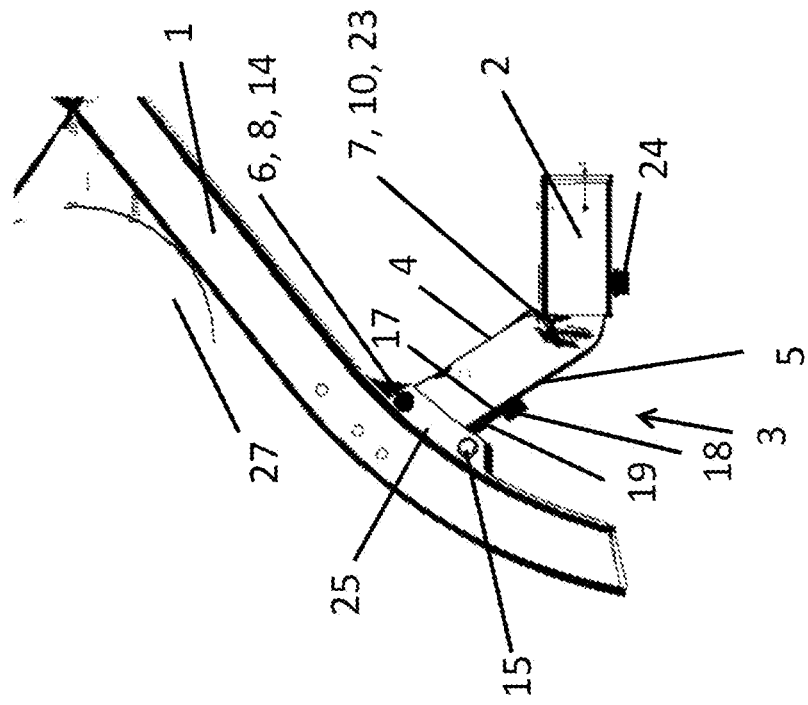
Figure 8:
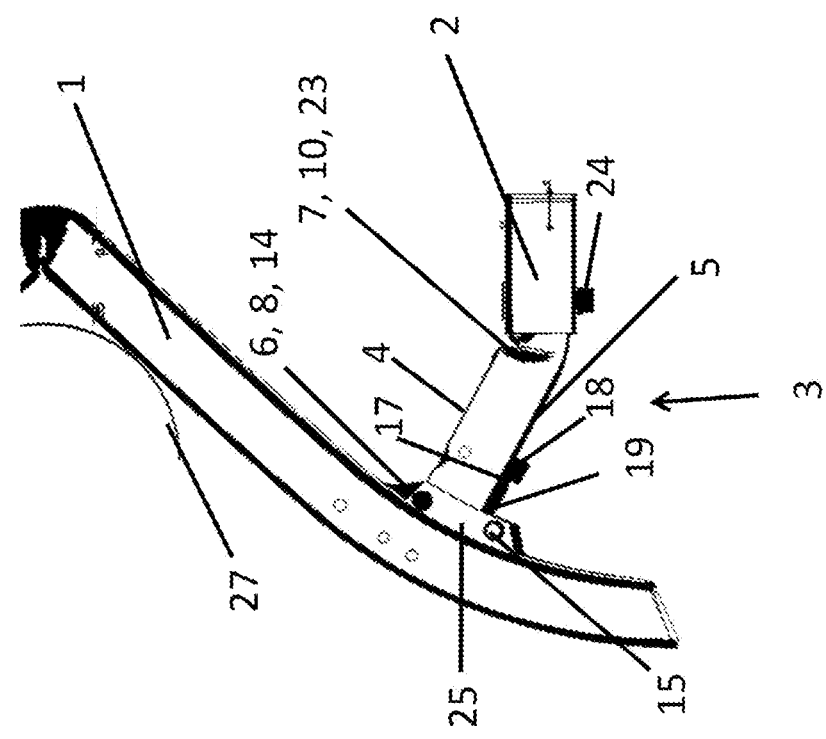

FIGS. 7 and 8 now show the further deformation of the bumper arrangement in this crash situation.

In FIG. 7, the rotation of the crash box 3 and the deformation thereof about the rear axis of rotation 7, which is formed by the structural element 10 in the form of the predetermined deformation element 23 or bead, has begun since the rotation of the crossmember 1 about the axis of rotation 6 cannot be continued because of the hook element 18 fastening to the tab 19. By means of the tensile loading on the outer wall 5 of the crash box 3, the rotation of the crash box 3 about the rear axis of rotation 7 therefore now begins, wherein the crash box 3 is deformed in a targeted manner in its rear region, but does not collapse in an uncontrolled manner. By this means, it is possible to introduce the energy, which has not yet been dissipated by the deformation of the crossmember 1 and the crash box 3, in a targeted manner into the body element 2, which is in the form here of the vehicle longitudinal member, past the passenger cell into the body.

Figure 9:
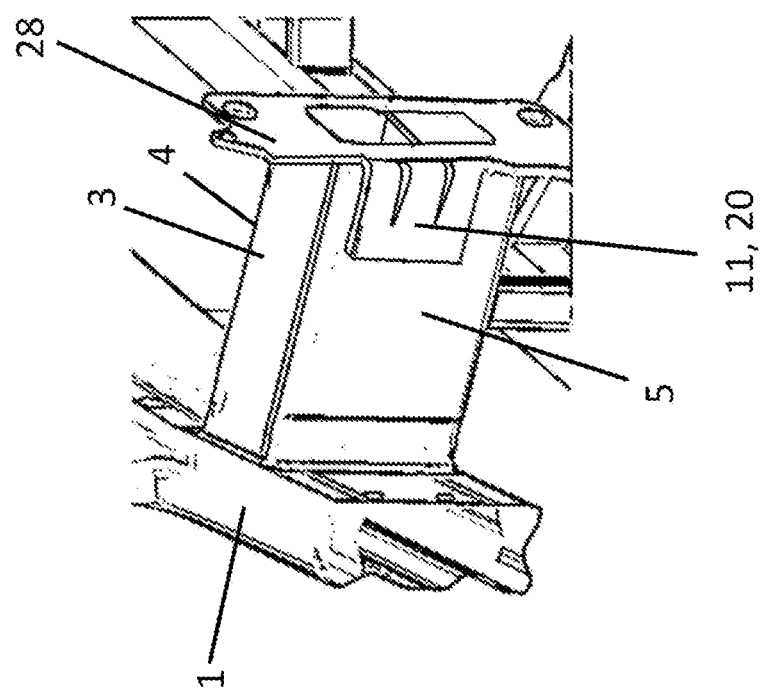
Figure 11:
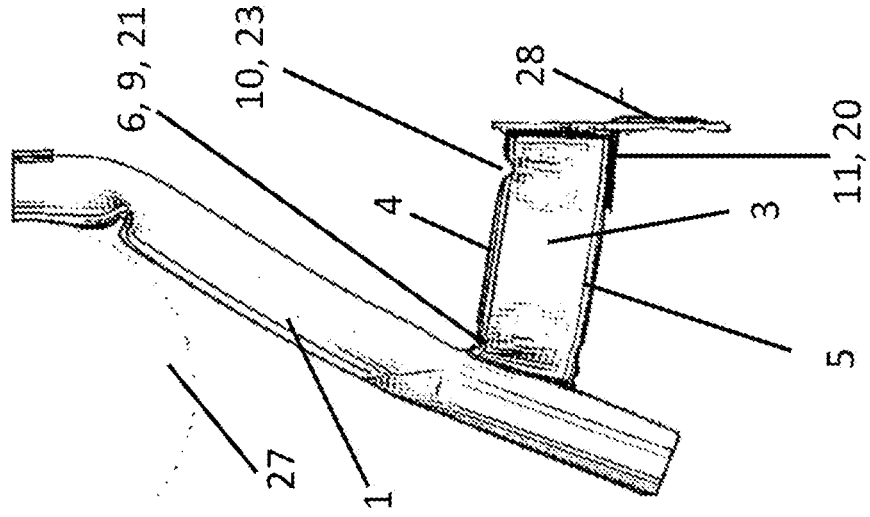
FIGS. 11 to 14: show a chronological impact scenario of a bumper arrangement of FIGS. 9 and 10 in a top view from above.
Figure 12:
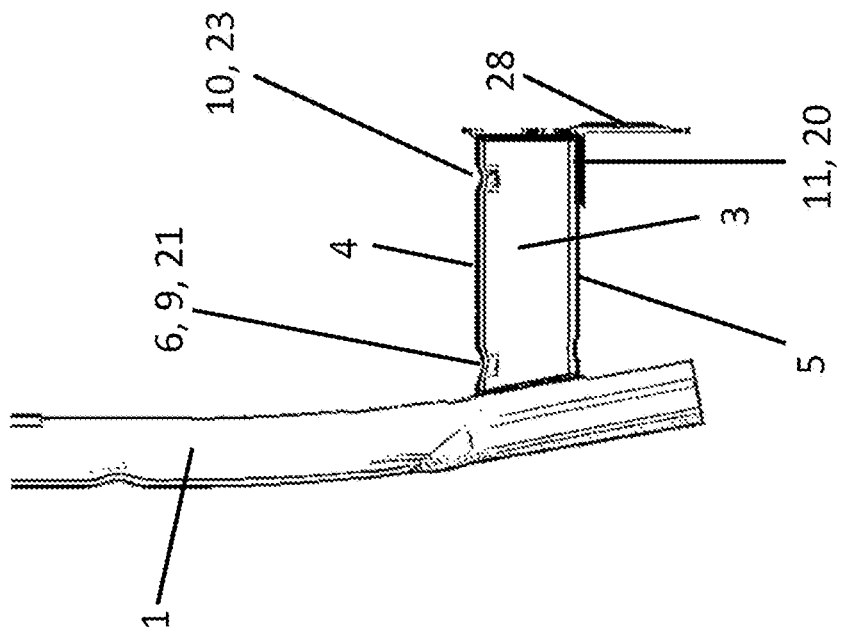
Figure 13:
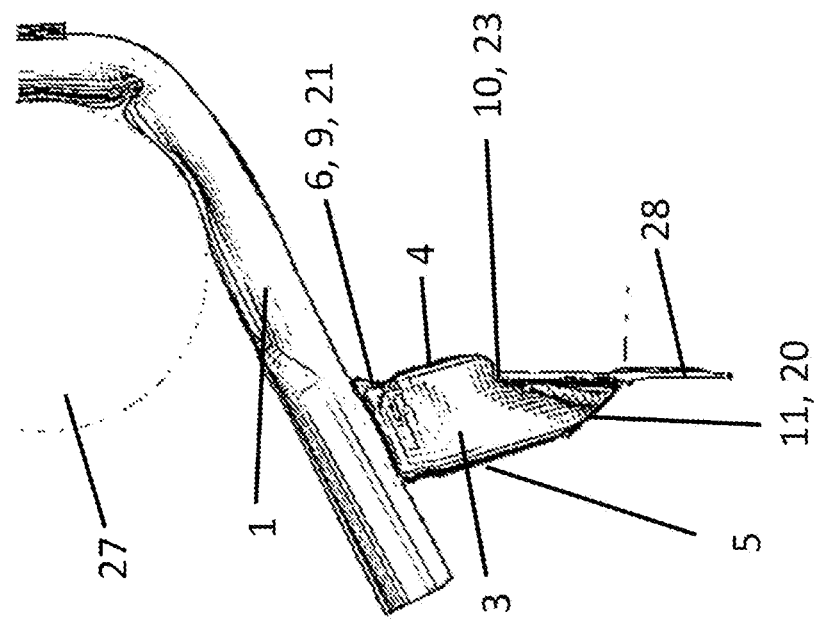
Figure 14:
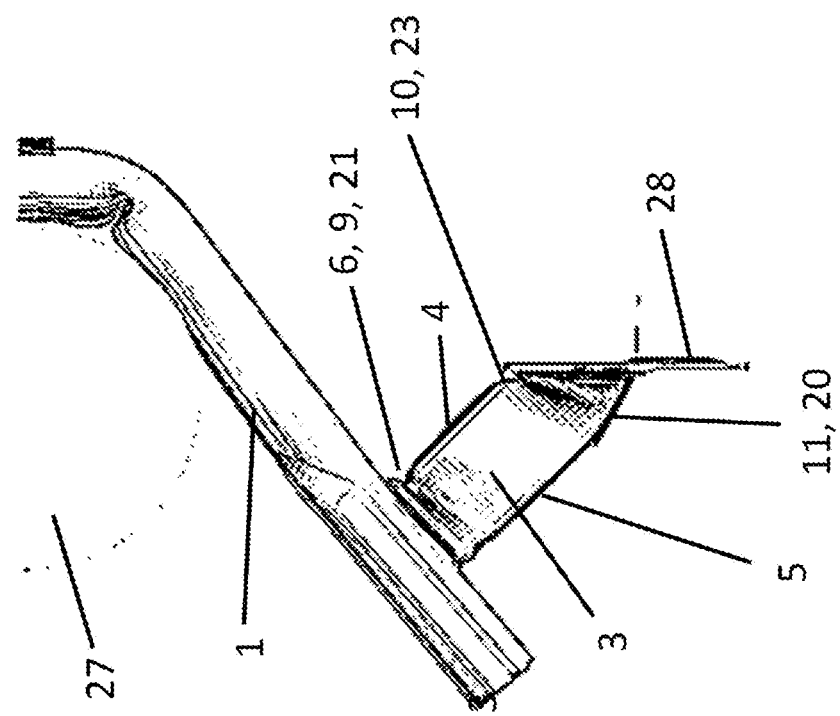

FIG. 9 now shows a second exemplary embodiment of a bumper arrangement according to the invention, in which the crash box 3 is connected to the crossmember 1 in an integrally bonded manner via welded connections. A tension relief element 11 in the form of a tab 20 is arranged on the outer wall 5 of the crossmember 3, said tension relief element also having a flange plate 28 which is connectable or is connected to a body element 2, not illustrated here, in the form of a body longitudinal member. In this exemplary embodiment, the crash box 3 is connected to the body element 2 or to the body longitudinal member via a flange plate 28.

Figure 10:
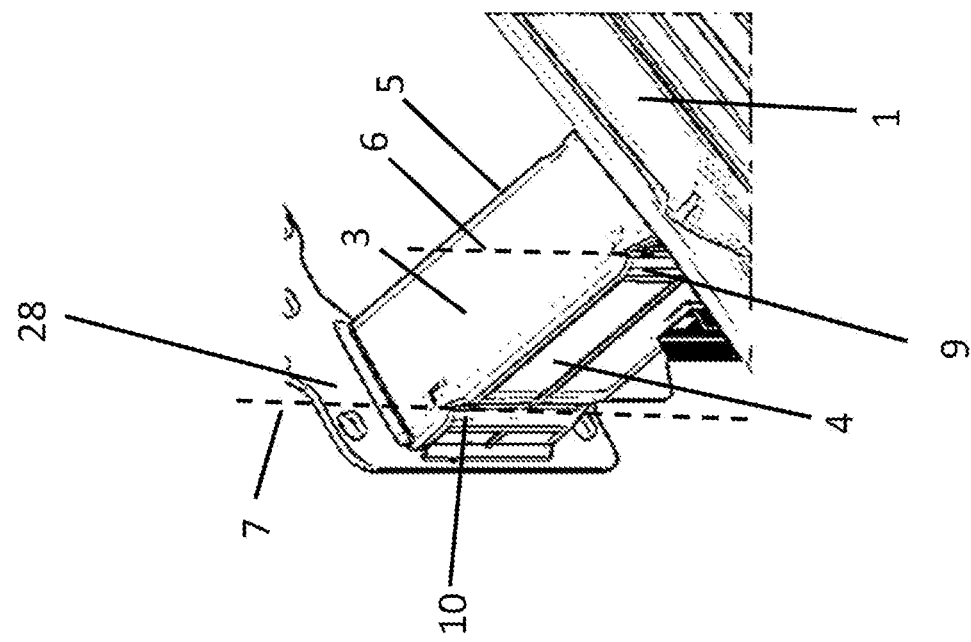
FIGS. 9 and 10: show two perspective illustrations of a second exemplary embodiment of a bumper arrangement according to the invention.

The illustration of FIG. 10 now shows the bumper arrangement of FIG. 9 in a different perspective view, as a result of which the inner wall 4 of the crash box 3 can now be readily seen. In this exemplary embodiment, the inner wall 4 has a front structural element 9 in the form of a bead by which a front axis of rotation 6 is formed. In the rear region, the inner wall 4 of the crash box 3 has a further structural element 10 in the form of a bead which forms a rear axis of rotation 7. It is also possible to clearly see here the flange plate 28 which is connected to the crash box 3 by means of welded connections and via which the crash box 3 is connected or is connectable to the body element 2, not illustrated here.

FIGS. 11 to 15 now show the chronological sequence of a central impact of an obstacle 27 against the crossmember 1, wherein it can clearly be seen here that the crossmember 1 rotates in relation to the crash box 3 about the axis of rotation 6, which is in the form of structural element 9 in the form of a bead, wherein the crash box 3 is already slightly deformed on its inner wall 4 in the region of the structural element 9 or of the bead. By means of the tension relief element 11, which is in the form of a tab, in the rear region on the outer wall 5 of the crash box 3, an uncontrolled collapsing of the crash box 3 and failure of the connection to the body longitudinal member or the flange plate is prevented. On the contrary, said tension relief element 11 absorbs or dissipates a large portion of the impact energy 3 by dissipating the load peaks by deformation of the crossmember 1 and rotation of the crash box 3 about the axis of rotation 6 in the front region of its inner wall 4 of the crash box 3.

Only over the further course does a rotation about the rear axis of rotation 7 on the inner wall 4 of the crash box 3 then begin. The structural element 10 which is in the form of a predetermined deformation element 21 in the form of a bead acts at the same time as a rear axis of rotation 7, about which the crossmember 1 together with crash box 3 is now pivoted further. By means of the configuration in this exemplary embodiment, an uncontrolled collapsing of the crash boxes 3 is avoided by the tension relief element 11 and the specially designed axes of rotations 6 and 7 and the structural elements 9 and 10 which are in the form of predetermined deformation elements 21 and 23 in the form of beads running vertically or in the vertical direction of the motor vehicle. On the contrary, a targeted deformation of the crossmember 1 and of the crash boxes 3 in the manner of a joint is achieved, as a result of which load peaks at the beginning of the impact are absorbed and excess energy which is not converted into deformation energy of the crossmember 1 and of the crash boxes 3 is introduced in a targeted manner into the body element, in particular the longitudinal member of a body, past the passenger cell.

FIGS. 15 to 17 once again illustrate a chronological sequence of a central impact, in particular in the event of what is referred to as the "Center Pole Test", wherein the deformation of the crash box 3 is shown with reference to a perspective illustration of the bumper arrangement. By this means, it is once again clarified that the crash box 3 is deformed in a targeted manner and collapse of the crash box 3 is prevented.

LIST OF REFERENCE SIGNS

1 Crossmember
2 Body element/body longitudinal member
3 Crash box
4 Inner wall
5 Outer wall
6 Axis of rotation
7 Axis of rotation
8 Structural element
9 Structural element
10 Structural element
11 Tension relief element
12 Tension delay element
13 Angular element
14 Screw connection 15 Screw connection
16 Leg
17 Leg
18 Hook element
19 Tab
20 Tab
21 Predetermined deformation element
22 Screw sleeve
23 Predetermined deformation element
24 Screw connection
25 Tab
26 Tab
27 Obstacle
28 Flange plate

What is claimed is:

1. A bumper arrangement for a motor vehicle, comprising:
   a crossmember;
   a body element; and
   a crash box arranged between the crossmember and the body element, wherein
   a. at least one of a front axis of rotation is formed by a structural member, or a rear axis of rotation is formed by a deformation element in an inner wall of the crash box, and
   b. a tension relief element or a tension delay element is arranged in an outer wall of the crash box.

2. The bumper arrangement as claimed in claim 1, wherein the tension delay element is connected by a screw connection in a region of the inner wall of the crash box both to the crossmember and to the crash box and in a region of the outer wall to the crossmember.

3. The bumper arrangement as claimed in claim 1, wherein the tension delay element is in the form of an angular element having first and second legs, which is connected by a screw connection in a region of the inner wall of the crash box both to the crossmember and to the crash box and in a region of the outer wall to the crossmember, wherein the first leg is arranged substantially at an obtuse angle with respect to the second leg and the second leg is arranged substantially parallel to a longitudinal direction of the motor vehicle and, in its end region, has a hook element which is designed to be fastenable in an end stop on a tab arranged on the crash box, wherein the first screw connection in the region of the inner wall is designed as the structural element forming the front axis of rotation.

4. The bumper arrangement as claimed in claim 1, wherein the tension relief element is in the form of a tab which is connected to the outer wall of the crash box and to the body element, wherein the structural element which forms the front axis of rotation, is in the form of a predetermined deformation element running at least one of vertically or in a vertical direction of the motor vehicle is arranged on the inner wall of the crash box, and wherein the predetermined deformation element is in the form of a bead, one or more holes, a perforation, a strength reduction region, or a notch in an inner crash box corner facing the crossmember.

5. The bumper arrangement as claimed in claim 2, wherein the connection of an angular element in the region of the outer wall of the crash box to the crossmember is realized by at least one of a screw connection or a welded connection.

6. The bumper arrangement as claimed in claim 5, wherein the screw connection in a region of an outer wall of the deformation element is forcibly guided within an elongated hole or by a guide tab.

7. The bumper arrangement as claimed in claim 5, wherein a screw of the screw connection is guided through a screw sleeve of the angular element.

8. The bumper arrangement as claimed in claim 4, wherein the tab is connected to at least one of the crash box or to the body element, or wherein at least one screw connection connects the tab to a flange plate connected to the body element by at least one screw connection.

9. The bumper arrangement as claimed in claim 4, wherein the tab is connected to at least one of the crash box or to the body element, or to a flange plate connected to the body element by at least one welded connection.

10. The bumper arrangement as claimed in claim 1, wherein the rear axis of rotation on the inner wall of the crash box is formed by the deformation element which is in the form of a predetermined deformation element, and wherein the predetermined deformation element runs at least one of vertically or in a vertical direction of the motor vehicle.

11. The bumper arrangement as claimed in claim 1, wherein the outer wall of the crash box includes at least one reinforcing element at least in sections.

12. The bumper arrangement as claimed in claim 11, wherein the at least one reinforcing element is in the form of a sheet metal reinforcement or a horizontal bead.

13. The bumper arrangement as claimed in claim 10, wherein the predetermined deformation element is in the form of a bead, one or more holes, a perforation, or a strength reduction region.

14. The bumper arrangement as claimed in claim 1, wherein at least one predetermined deformation element runs at least one of vertically or in a vertical direction of the motor vehicle and is arranged on the outer wall of the crash box.

15. The bumper arrangement as claimed in claim 4, wherein the tab is connected to at least one of a longitudinal member of the body element or to a flange plate connected to the body element.

16. The bumper arrangement as claimed in claim 11, wherein the at least one reinforcing element is disposed opposite the rear axis of rotation of the inner wall.

17. The bumper arrangement as claimed in claim 14, wherein the at least one predetermined deformation element is formed as a bead, one or more holes, a perforation, or a strength reduction region.

* * * * *

UNITED STATES PATENT AND TRADEMARK OFFICE
CERTIFICATE OF CORRECTION

PATENT NO. : 11,148,624 B2
APPLICATION NO. : 16/797343
DATED : October 19, 2021
INVENTOR(S) : Martin Vovesny It is certified that error appears in the above-identified patent and that said Letters Patent is hereby corrected as shown below:

In the Claims

Claim 1, Column 9, Line 22, delete "member" and insert --element-- therein.
Claim 3, Column 9, Line 43, delete "first".

Signed and Sealed this
Third Day of May, 2022

Katherine Kelly Vidal
*Director of the United States Patent and Trademark Office*